United States Patent [19]

Hoshino et al.

[11] Patent Number: 5,451,759
[45] Date of Patent: Sep. 19, 1995

[54] USING HIGH-PERMEABILITY MAGNETIC ELEMENTS RANDOMLY SCATTERED IN THE OBJECTS

[75] Inventors: Hidekazu Hoshino; Itsuo Takeuchi; Tatsuya Kurihara, all of Yokohama, Japan

[73] Assignee: NHK Spring Co., Ltd., Yokohama, Japan

[21] Appl. No.: 263,050

[22] Filed: Jun. 21, 1994

[30] Foreign Application Priority Data

| | | | |
|---|---|---|---|
| Jun. 24, 1993 | [JP] | Japan | 5-153532 |
| Jul. 13, 1993 | [JP] | Japan | 5-173062 |
| Sep. 17, 1993 | [JP] | Japan | 5-231119 |

[51] Int. Cl.$^6$ ........................ G06K 7/08; G06K 19/06
[52] U.S. Cl. ........................................ 235/449; 235/493
[58] Field of Search ............... 235/449, 450, 380, 493; 340/825.34; 360/113, 115

[56] References Cited

U.S. PATENT DOCUMENTS

| | | | |
|---|---|---|---|
| 4,034,211 | 7/1977 | Horst et al. | 235/454 |
| 4,114,032 | 9/1978 | Brosow et al. | 235/435 |
| 4,218,674 | 8/1980 | Brosow et al. | 340/109 |
| 4,450,348 | 5/1984 | Stockburger et al. | 235/360 |
| 4,806,740 | 2/1989 | Gold et al. | 235/493 X |
| 4,820,912 | 4/1989 | Samyn | 235/449 |
| 4,837,426 | 6/1989 | Pease et al. | 235/449 X |
| 5,289,122 | 2/1991 | Shigeno | 235/825.34 X |

FOREIGN PATENT DOCUMENTS 0036442  3/1977  Japan .................. 240/825.34

Primary Examiner—Donald Hajec
Assistant Examiner—Le Thien Minh
Attorney, Agent, or Firm—Frishauf, Holtz, Goodman, Langer & Chick

[57] ABSTRACT

An object to be checked has a scanning region which contains a large number of magnetic elements scattered at random. Each of the magnetic elements is made up of an element main body formed of a high molecular material, and magnetic metal powder contained in the element main body. A processing apparatus employed for checking whether or not the object is authentic has a magnetic sensor which is made up of a pair of MR elements and a magnet. The MR elements are arranged side by side in the direction in which the scanning region is scanned. In the manufacturing process of the object, a detection signal which is based on variations in the output ratio between the MR elements is produced, with the scanning region of the object being moved. The detection signal is converted into a cipher code, and this cipher code is recorded in a code indicator section. When the object is checked for authenticity, a detection signal obtained by scanning the scanning region is collated with the cipher code recorded in the code indicator section. When the detection signal and the cipher code agree with each other, the object is determined as being authentic.

6 Claims, 5 Drawing Sheets

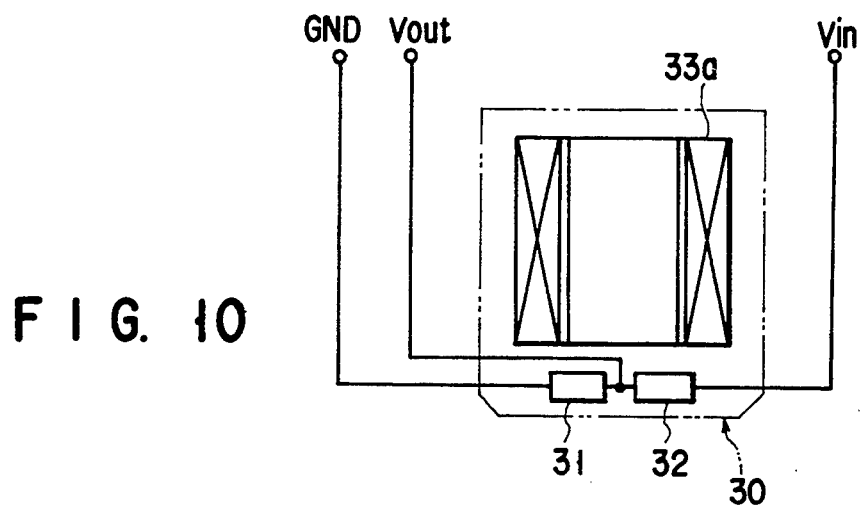
FIG. 10
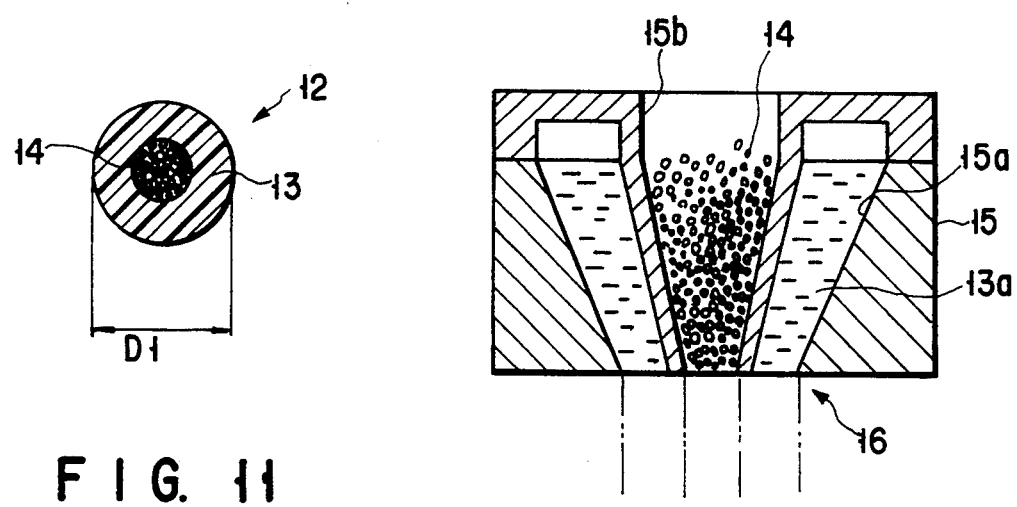
FIG. 11
FIG. 12
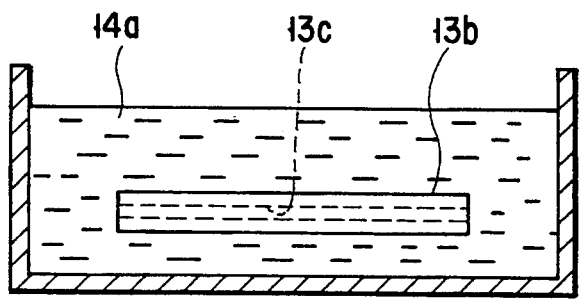
FIG. 13
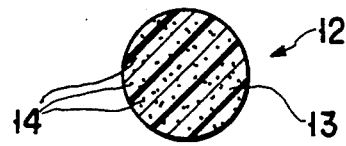
FIG. 14

USING HIGH-PERMEABILITY MAGNETIC ELEMENTS RANDOMLY SCATTERED IN THE OBJECTS

Background of the Invention

1. Field of the Invention

The present invention relates to a method and apparatus for checking objects which should be prevented from being forged and are to be checked for authenticity, such as important documents, securities, paper money, checks, travelers' checks, bank cards, prepaid cards, ID cards, CD cards, credit cards, passports, admission tickets, art objects, and betting tickets for public-managed gambling games.

2. Description of the Related Art

A checking method and apparatus utilizing microwaves are known in the art as measures for checking the authenticity of documents or the like, as described in PCT National Publication No. 63-501250 (U.S. Pat. No. 4,820,912). According to this publication, microwaves are applied to a large number of metallic wires which are embedded and scattered at random in a document, and a proper digital mark responsive to a response microwave bundle is recorded in a suitable region of the document according to specific rules. To check the authenticity of the document, microwaves are applied to the document, and a response microwave bundle is collated with the digital mark. The document is determined as being authentic when the microwave bundle and the digital mark agree with each other.

The checking means which utilizes microwaves, as in the apparatus of the above publication, has problems in that the measurement of a response microwave bundle is susceptible to external noise, and the signal-to-noise ratio (S/N ratio) is lowered thereby. In addition, the apparatus of the publication may constitute a source of noise since it oscillates microwaves. Further, a microwave transmitter and a microwave receiver are generally large in size and entail high costs.

In the conventional art, a mark is recorded on a predetermined part of paper money in magnetic ink, so as to identify the denomination of the paper money. To be more specific, the same mark is recorded on the predetermined part of the bills or notes of the same denomination. If the mark is detected and known, it can be easily forged. This being so, the mark recorded on paper money in magnetic ink is not very useful in preventing forgery.

SUMMARY OF THE INVENTION

Accordingly, an object of the present invention is to provide a method and apparatus which can reliably check the authenticity of objects, such as paper money, which prevent the objects from being forged, and which is free of the problem of noise and therefore ensure a high S/N ratio.

To attain this object, the present invention provides an apparatus which check the authenticity of an object having a base member formed of a nonmagnetic material, a scanning region in which magnetic elements formed of a magnetic material are scattered at random, and a code indicator section, and which comprises:

- a magnetic sensor including first and second magneto-electric transducers arranged side by side in a direction in which the scanning region of the object is scanned;
- magnetic field generating means for applying an external magnetic field to the magneto-electric transducers and the scanning region;
- conveyance means for conveying the object in the scanning direction relative to the magneto-electric transducers;
- a detection circuit for detecting variations in electric outputs which the magneto-electric transducers produce in accordance with the distribution of the magnetic elements when the magnetic elements pass a region in the neighborhood of the magneto-electric transducers, and for producing a detection signal peculiar to the scanning region;
- means for producing a cipher code by enciphering the detection signal produced by the detection circuit;
- code write means for recording the cipher code in the code indicator section;
- read means for reading the cipher code recorded in the code indicator section; and
- means for collating the cipher code read by the read means with the detection signal produced by the detection circuit, and for determining that the object is authentic when the cipher code and the detection signal agree with each other.

The magnetic elements are, for example, magnetic polymer elements, each of which includes an element main body formed of a high molecular material and magnetic metal powder contained in the element main body. As the magnetic metal powder contained in the magnetic polymer elements, either the powder of a magnetically-soft material having high magnetic permeability (such as Permalloy, Sendust, Co-based amorphous material, or soft ferrite) or the powder of a magnetically-hard material having high coercive force (such as ferrite, Sm-Co alloy, or Nd alloy), is suitable for use. As the magneto-electric transducers described above, it is suitable to employ magnetoresistor elements (hereinafter referred to simply as "MR elements") whose electric resistance increases substantially in proportion to the intensity of the magnetic field. Since the magnetoelectric transducers are only required to have electric characteristics (e.g., electric resistance) which change in accordance with the intensity of the magnetic field, the MR elements may be replaced with magnetic diodes or Hall elements.

In the case where an object is magnetically scanned by the apparatus mentioned above, the "reproducibility" and "randomness" of a detection signal are very important. The "reproducibility" used herein represents whether or not a substantially identical detection waveform is produced from the same object whenever the object is magnetically scanned. On the other hand, the "randomness" represents the extent of uniqueness or peculiarity of the waveform of a detection signal. If "the randomness is high", this means that the waveform of a detection signal is very unique to the object from which the detection signal is produced. Ideally, it is desired that different objects produce different detection signals having their own peculiar waveform patterns. If the "randomness is low", it is likely that the detection signals produced from two or more different objects will have similar waveform patterns, and the degree of security is adversely affected thereby.

Where MR elements are employed as the magneto-electric transducers, both the "reproducibility" and the "randomness" can be improved by determining the element spacing (i.e., distance between the MR elements) to be 1 to 30 times greater than the diameter or width of a magnetic element. If the width of each MR element is less than ⅓ of the element spacing, and the length thereof is 3 to 20 times greater than that element spacing, both the "reproducibility" and the "randomness" can be further improved.

According to the present invention, a large number of magnetic elements are incorporated in the scanning region of an object during the manufacturing process of the object. The magnetic elements can be in the form of wires, fibers, foils, powder, etc. Where magnetic elements in the form of wires, fibers or foils are employed, they are incorporated in the scanning region such that they are orientated at random. Where magnetic elements in the form of powder are employed, they are scattered or distributed at random in the scanning region such that the distribution of them (i.e., a magnetic element density) varies depending upon the portions of the scanning region. Alternatively, the magnetic elements in the form of powder are incorporated in the scanning region with the same density such that a random pattern is described inside the scanning region. These two methods may be combined, if so desired. The scanning region incorporating the magnetic elements is scanned by the magnetic sensor mentioned above, and the detection signal which is obtained thereby and which is peculiar to the scanning region of the object is used for checking the authenticity of the object.

When the scanning region of the object is moved to pass the first and second magneto-electric transducers, the magnetic fluxes passing through the first and second magneto-electric transducers vary in accordance with the distribution of the magnetic elements, with the result that characteristics of each magneto-electric transducer varies with time. A change in the outputs of the two magneto-electric transducers is detected and produced as a detection signal. Since this detection signal varies for each minute portion of the scanning region in accordance with the density, size and orientation of the incorporated magnetic elements, the output pattern of the detection signal is peculiar to the scanning region. When the object is manufactured, the detection signal is converted into a cipher code according to specific rules, and the cipher code is recorded in the code indicator section of the object or a host computer or the like.

In the collation process for checking whether or not the object is authentic, the scanning region is scanned in a similar manner to the process of manufacturing the object, so as to obtain a detection signal peculiar to the scanning region. When the detection signal, thus obtained, agrees with the cipher code recorded in the code indicator section, the object is determined as being authentic.

According to the present invention, the object, in which a large number of magnetic elements are incorporated and arranged at random, is magnetically checked on the basis of outputs of the magneto-electric elements. In comparison with a checking means that utilizes microwaves, the processing apparatus of the present invention is small in size and can be manufactured at low cost. In addition, since the detection signal can be produced without utilizing an intense magnetic field, the generation of noise is prevented and the S/N ratio is high, accordingly. Further, since the distribution of the magnetic elements arranged at random in the scanning region is read for each of objects, the objects cannot be forged easily.

BRIEF DESCRIPTION OF THE DRAWINGS

FIG. 10 is a schematic diagram showing one modification of the magnetic sensor;

FIG. 11 is a sectional view showing one modification of a magnetic element;

FIG. 12 is a sectional view showing an apparatus employed for manufacturing such magnetic elements as are depicted in FIG. 11;

FIG. 13 is a sectional view showing another apparatus employed for manufacturing magnetic elements; and FIG. 14 is a sectional view showing another modification of a magnetic element.

DETAILED DESCRIPTION OF THE PREFERRED EMBODIMENTS

One embodiment of the present invention will now be described with reference to FIGS. 1 through 9.

Figure 2:
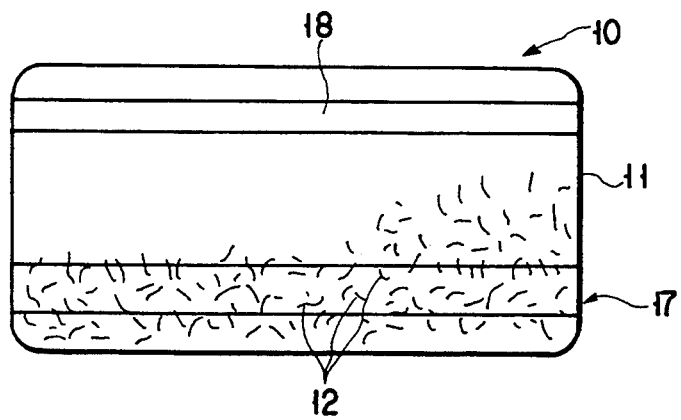
FIG. 2 is a schematic plan view showing an example of a to-be-checked object.

As is shown in FIG. 2, a large number of magnetic elements 12 are scattered at random in the base member 11 of an object 10 to be checked, such that the magnetic elements 12 are oriented in many and unspecified directions. The base member 11 is formed of a non-magnetic material, such as paper or plastics.

As the material of the magnetic elements 12, it is suitable to use a magnetic metal selected from high-magnetic permeability materials, such as Permalloy, Co-based amorphous material, Fe-Ni alloy, soft ferrite, etc. The cross section of the magnetic elements 12 need not have a circular shape; it may have a polygonal shape, a rectangular shape, an oval shape, or any other shape desired. Although the magnetic elements 12 shown in the drawings are in the form of wires (fibers), they may be in the form of foils or powder. Further, they may be a mixture of two or three types of elements, e.g., a mixture of wire-like elements and foil-like elements.

In the case where the magnetic elements 12 are in the form of wires or foils, the outer diameter (or thickness) of the magnetic elements 12 must be determined in accordance with the size of the object 10, but it is usually within the range of 5 to 50 $\mu$m. The length of the magnetic elements 12 is approximately within the range of 1 to 30 mm. In the case where the magnetic elements 12 are in the form of powder, the diameter of powder particles is approximately within the range of 0.1 $\mu$m to 10 $\mu$m. These magnetic elements 12 are incorporated in a specific portion of the scanning region 17 at a certain density when the object 10 is manufactured.

A code indicator section 18 is provided on the object 10. Encoded information which is peculiar to the object 10 and which corresponds to the state in which the magnetic elements 12 are distributed in the scanning region 17, is recorded in the code indicator section 18 by means of a processing apparatus 20, such as that shown in FIG. 1.

The processing apparatus 20 comprises a housing 25 and a conveyor mechanism 26. The conveyor mechanism 26 includes object-conveying components 27, such as a belt and rollers, and conveys the object 10 at the predetermined speed in the direction indicated by arrow F in FIG. 1.

Figure 1:
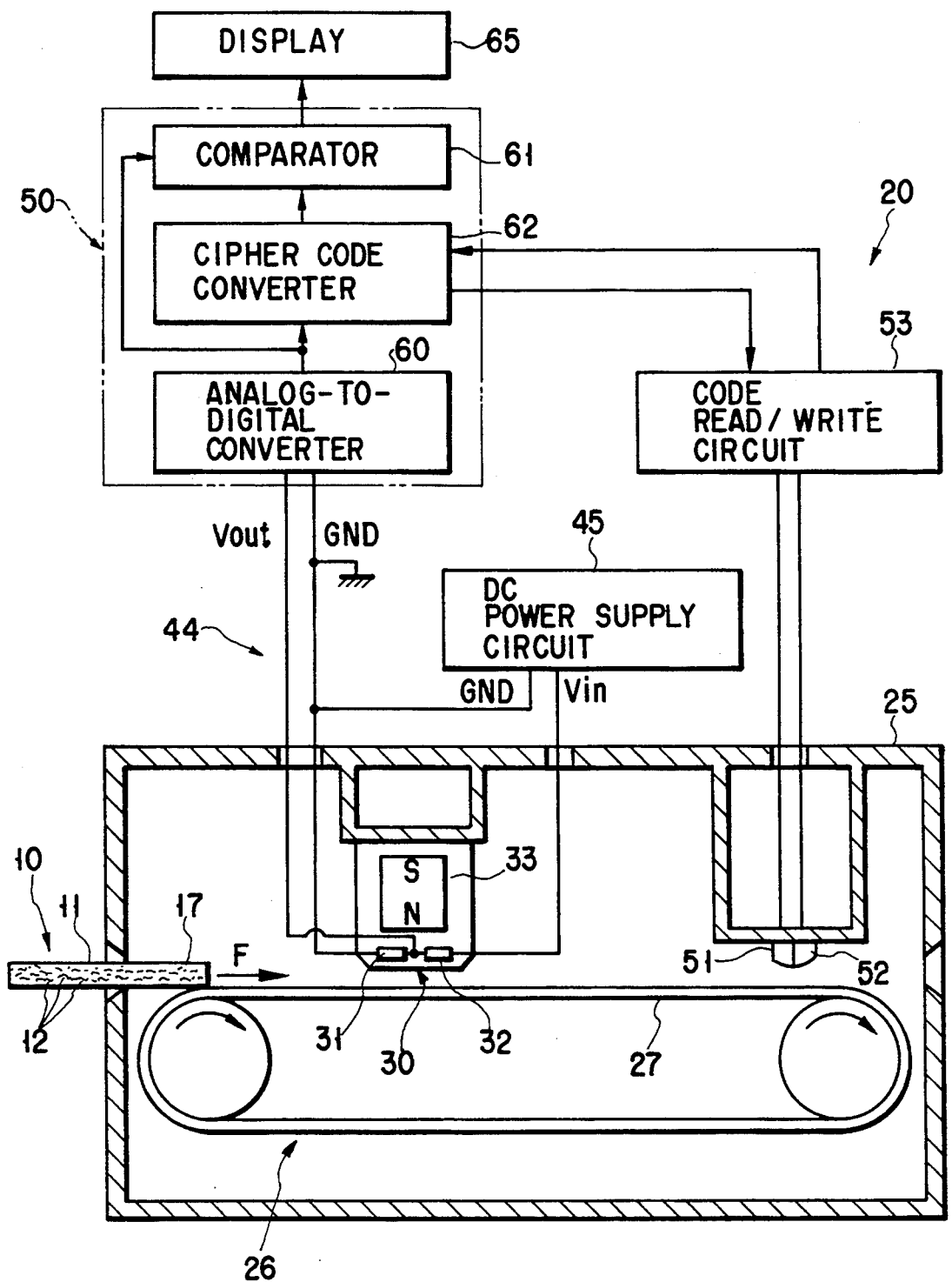
FIG. 1 is a partially-sectional side view showing a processing apparatus according to one embodiment of the present invention.

A magnetic sensor 30 is arranged in the moving path of the object 10. The magnetic sensor 30 comprises a first MR element 31 and a second MR element 32 (which are an example of a pair of magneto-electric transducers). The first and second MR elements 31 and 32 are arranged side by side in the moving direction F of the object 10, i.e., in the direction in which the object 10 is scanned. The magnetic sensor 30 also comprises a magnet 33 (i.e., a magnetic field generating means) located behind the MR elements 31 and 32. The magnet 33 may be a permanent magnet, as shown in FIG. 1; alternatively, it may an electromagnet having a coil 33a, as shown in FIG. 10.

The MR elements 31 and 32 are magnetoresistor elements whose electrical resistances vary in accordance with the intensity of the magnetic field applied thereto. Either magnetoresistor elements having positive magnetic characteristics (e.g., elements formed of a compound semiconductor, such as indium antimonide or gallium arsenide) or magnetoresistor elements having negative magnetic characteristics (e.g., elements formed of a ferromagnetic material, such as nickel-cobalt or Permalloy) are used in accordance with the specifications required.

The first and second MR elements 31 and 32 are connected together and are arranged such that the magnetic field generated by the magnet 33 acts on them with the same intensity. The first MR element 31 is connected through a detection circuit 44 to a controller 50 described below, while the second MR element 32 is connected to a DC power supply circuit 45. The object 10 is moved such that its scanning region 17 travels in the direction in which the MR elements 31 and 32 are arranged.

Figure 3:
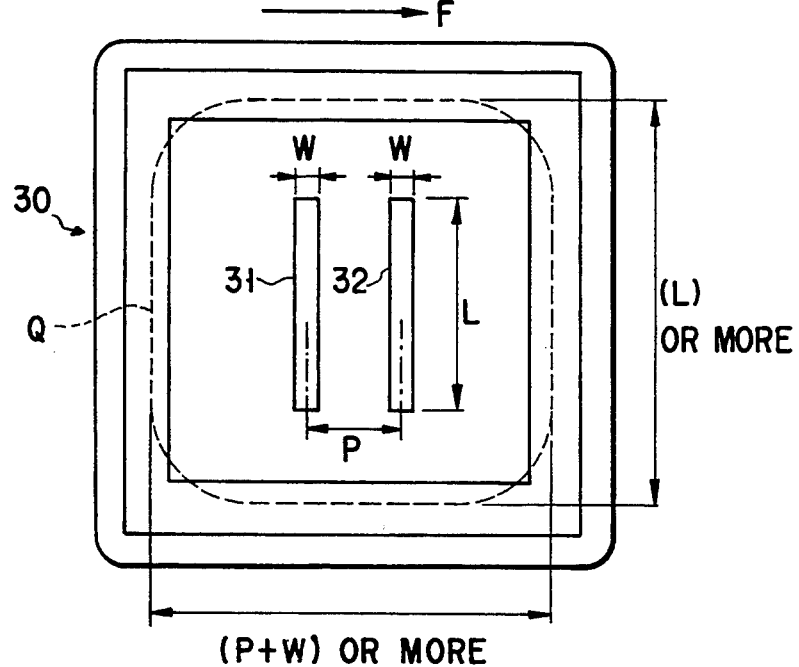
FIG. 3 is a plan view of the magnetic sensor employed in the processing apparatus.

As is shown in FIG. 3, the first and second MR elements 31 and 32 are arranged in parallel to each other and extend in a direction perpendicular to the scanning direction F. In FIG. 3, "P" denotes an element spacing (i.e., the spacing between the MR elements 31 and 32), "W" denotes an element width (i.e., the width of one MR element), and "L" denotes an element length (i.e., the length of one MR element). In the present invention, element spacing P, element width W, and element length L are determined such that element spacing P is 1 to 30 times greater than the diameter or width of magnetic element 12, element width W is less than ⅓ of element spacing P, and element length L is 3 to 20 times greater than element spacing P. Preferably, element spacing P is 10 to 20 times greater than the diameter or width of magnetic element 12, and element length L is 5 to 10 times greater than element spacing P.

The research conducted by the inventors of the present invention showed that not only the resolution of a detection signal waveform but also the S/N ratio deteriorated in the case where element spacing P was shorter than the diameter or width of magnetic element 12. The research also showed that the resolution of the detection signal waveform deteriorated in the following two cases, namely, the case where element spacing P was 30 times greater than the diameter or width of magnetic element 12, and the case where element width W was greater than ⅓ of element spacing P. The research further showed that the reproducibility was poor in the case where element length L was less than the value which was three times greater than element spacing P, and that the randomness was poor when element length L exceeded the value which was 20 times greater than element spacing P.

For these reasons, element spacing P, element width W and element length L are determined to be within the ranges mentioned above. It should be noted that the reproducibility and randomness of the detection waveform can be remarkably improved when element spacing P is 10 to 20 times greater than the diameter or width of magnetic element 12 and element length L is 5 to 10 times greater than element spacing P.

Figure 4:
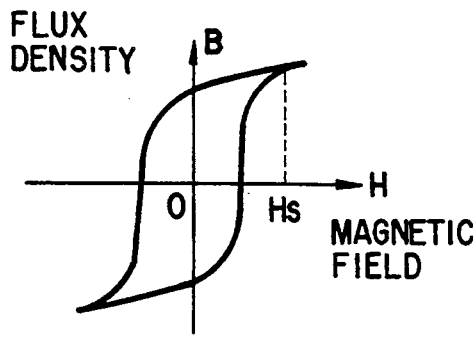
FIG. 4 is a graph showing the relationships between a magnetic field intensity and a magnetic flux density.

In the case where the magnetic elements 12 have such magnetic characteristics as indicated by the B–H curves shown in FIG. 4, the magnetic field which the magnet 33 applies to the magnetic elements 12 should have an intensity higher than that of the saturation magnetic field Hs. Where the magnetic field of the magnet 33 has such an intensity, the reproducibility of the detection signal waveform can be improved. Let it be assumed that the magnetic elements 12 are formed of Permalloy. Since the saturation magnetic field Hs is approximately 100 A/m, it is desired that the magnetic field applied to the magnetic elements 12 have a value greater than 100 A/m.

The range of the magnetic field which the magnet 33 applies to the MR elements 31 and 32 is indicated by the broken lines Q in FIG. 3. As indicated, the range should be equal to or greater than the sum of element spacing P and element width W ([p+W] or more) in the scanning direction F, and should be equal to or greater than element length L (L or more) in a direction perpendicular to the scanning direction F. When the range of application of the magnetic field is determined in this manner, the reproducibility of the detection signal waveform is improved.

Figure 5:
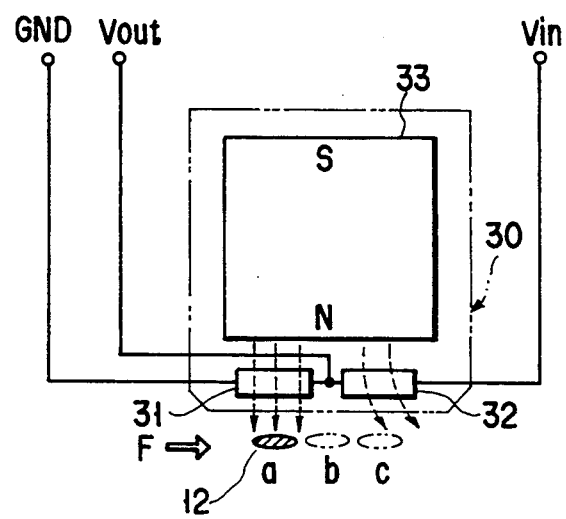
FIG. 5 is a schematic illustration of the magnetic sensor depicted in FIG. 1.
Figure 6:
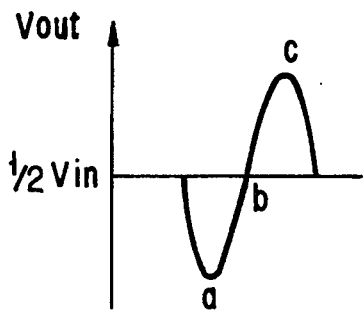
FIG. 6 is a graph showing how a fundamental output voltage of the magnetic sensor depicted in FIG. 5 changes.

As is conceptually illustrated in FIG. 5, when the magnetic elements 12 move through the region located under the MR elements 31 and 32, output voltage V out changes in the manner indicated in FIG. 6 in accordance with the positions a, b and c of the magnetic elements 12. To be more specific, when the magnetic elements 12 are not present in the vicinity of the MR elements 31 and 32, the magnetic field generated by the magnet 33 uniformly acts on the MR elements 31 and 32. Since, in this case, the MR elements 31 and 32 are equal to each other in resistance, output voltage $V_{out}$ is approximately half ($V_{in}/2$) of input voltage $V_{in}$. When the magnetic elements 12 move in the direction of arrow F and come into the region located under the MR elements 31 and 32, the magnetic fluxes passing through each of the MR elements 31 and 32 vary with time in accordance with the positions of the magnetic elements 12. Since, in this case, the MR elements 31 and 32 differ from each other in resistance, output voltage $V_{out}$ increases or decreases, with the level of $V_{in}/2$ as a reference level.

Output voltage $V_{out}$ is represented by the following formula:

$$V_{out} = V_{in} \times \{R_2/(R_1+R_2)\}$$

where $R_1$ is a resistance of the first MR element 31, and $R_2$ is resistance of the second MR element 32.

Figure 7:
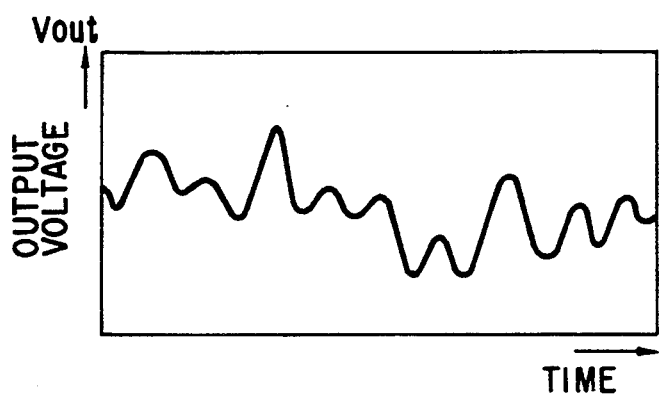
FIG. 7 shows an example of an output pattern of the magnetic sensor depicted in FIG. 5.

Since output voltage $V_{out}$ varies in accordance with the distributed state of the magnetic elements 12 (e.g., the distribution density, embedded depth, diameter [thickness], length, orientated directions, etc. of the magnetic elements 12), the detected output voltage pattern is peculiar to the object 10, as shown in FIG. 7.

The processing apparatus 20 comprises the following: a controller 50 incorporating a microcomputer or the like; a code write section 51 for recording a cipher code (which will be described below) in the code indicator section 18 of the object 10; and a code read section 52 for reading the cipher code recorded in the code indicator section 18. The code write section 51 and the code read section 52 are connected to a code read/write circuit 53. The controller 50 includes an analog-to-digital converter 60, a comparator 61, and a cipher code converter 62. A display 65 is connected to the controller 50.

A description will now be given of the operation of the apparatus 20 of the above embodiment.

Figure 8:
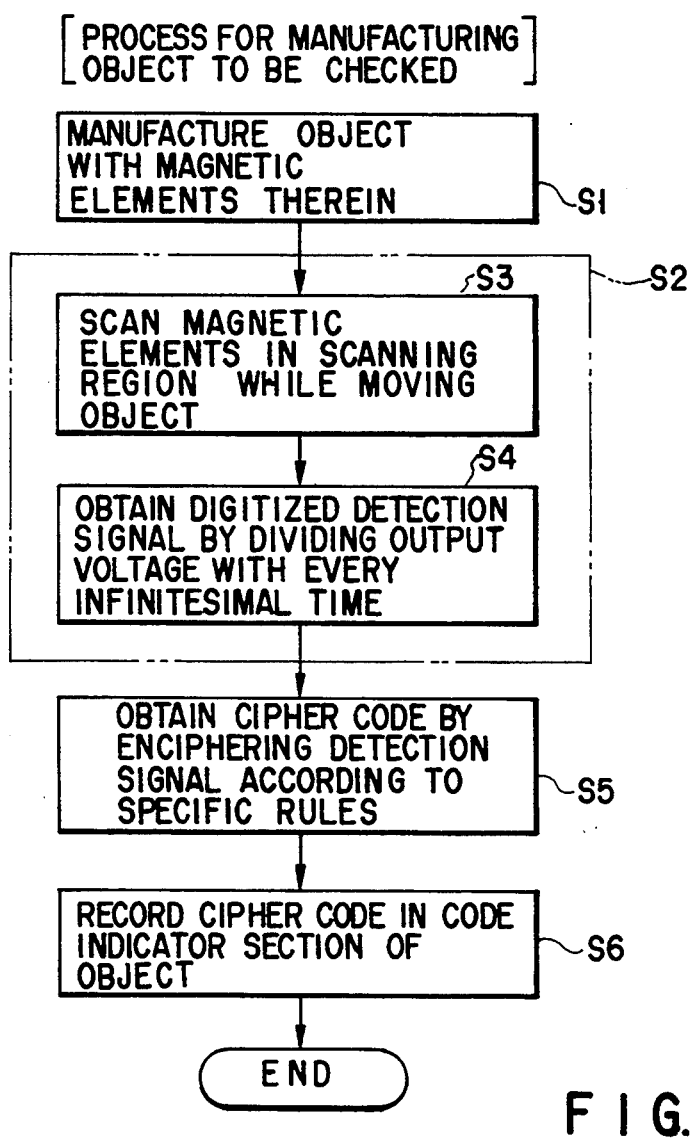
FIG. 8 is a flowchart showing the steps used for manufacturing a to-be-checked object.

FIG. 8 shows the outline of the process for manufacturing the object 10. In step S1, magnetic elements 12 are incorporated at random in the base member 11 of the object 10 when the base member 11 is manufactured. In the case where the magnetic elements 12 are in the form of wires (fibers) or foils, they are incorporated such that they are scattered at random inside the scanning region 17. In the case where the magnetic elements 12 are in the form of powder, they are scattered or distributed at random in the scanning region such that the distribution of them (i.e., a magnetic element density) varies depending upon the portions of the scanning region 17. Alternatively, the magnetic elements in the form of powder are incorporated in the scanning region with the same density such that a random pattern is described inside the scanning region. These two methods may be combined, if so desired.

In scanning & detection step S2 (which includes both scanning step S3 and detection step S4), the object 10 is moved at a predetermined speed in the direction of arrow F by means of the conveyor mechanism 26, and a detection signal which is peculiar to the object 10 and determined by the distribution of the elements 12 inside the scanning region 17 is obtained.

In scanning step S3, when the object 10 is moved at the predetermined speed in the direction of arrow F by means of the conveyor mechanism 26, a number of minute portions of the scanning region 17 sequentially pass the region in the vicinity of the MR elements 31 and 32. At the time, the magnetic fluxes passing through each of the MR elements 31 and 32 vary with time in accordance with the distribution of the magnetic elements 12 incorporated in each minute portion of the scanning region 17, i.e., in accordance with the distribution density, sizes, position, etc. of the elements 12 and in accordance with the characteristics of the metal powder 14. Since, therefore, the MR elements 31 and 32 have mutually-different resistances R1 and R2, the measured output voltage $V_{out}$ has a pattern which is peculiar or unique to the object 10. In detection step S4 of this embodiment, the scanning region 17 is scanned at the intervals of very short times, and output voltages corresponding to the very short times are ranked in a number of stages, for digitization. In this manner, an encoded detection signal peculiar to the scanning region 17 is obtained.

In enciphering step S5, the detection signal is converted into a cipher code according to specific rules by means of the cipher code converter 62. In recording step S6, the cipher code is recorded in the code indicator section 18 by means of the magnetic head of the code write section 51. In this embodiment, the code indicator section 18 is a magnetic strip, and the cipher code is magnetically recorded in the magnetic strip. However, the cipher code may be printed on the code indicator section 18 as an optically-readable mark or code (such as a bar code, a two-dimensional bar code, or an OCR character) by means of a printing head. Alternatively, holograms in which predetermined codes are recorded may be sequentially stamped in accordance with the cipher code. Further, the cipher code may be stored in the code storage area of the host computer.

Figure 9:
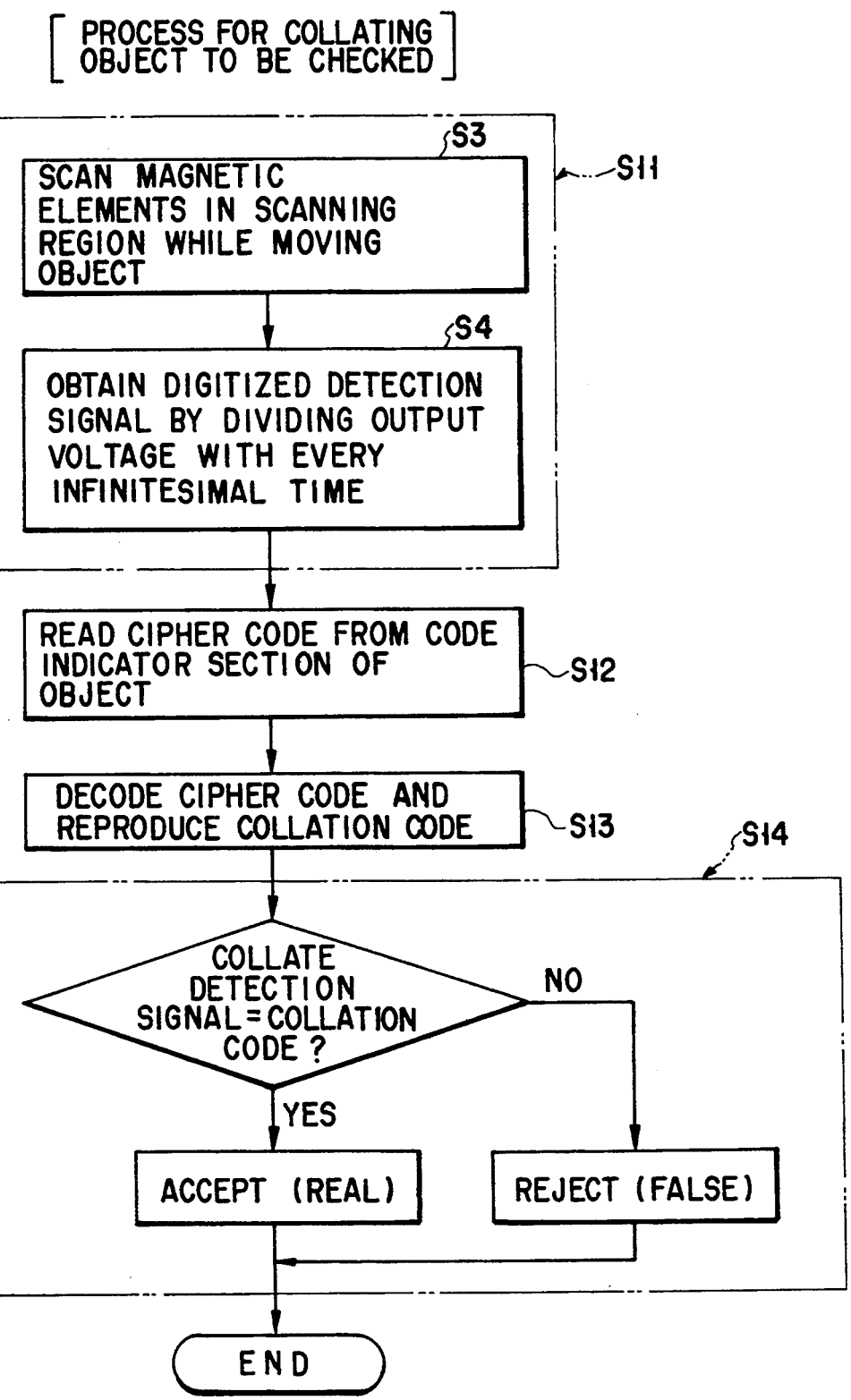
FIG. 9 is a flowchart showing the steps used for the collation of the object.

The processing apparatus 20 mentioned above is also used for checking whether or not the object 10 is authentic. FIG. 9 shows the outline of the collation process for checking the authenticity of the object 10. Step S11 of this collation process includes scanning and detection steps S3 and S4 which are similar to those of the manufacturing process of the object 10, and a detection signal determined by the distribution of the magnetic elements 12 is obtained by scanning the scanning region 17 at the predetermined speed by means of the magnetic sensor 30.

In code read step S12 of the collation process, the cipher code recorded in the code indicator section 18 is read by means of the code read section 52. The read cipher code is decoded according to predetermined rules by means of the cipher code converter 62, thus obtaining a code for collation. In determination step S14, the comparator 61 collates this code with the detection signal detected by the detection step S4. The object 10 is determined as being authentic only when the code and the detection signal agree with each other, and the results of collation are indicated on the display 65.

The processing apparatus 20 can reliably read the scanning region 17 even when the external magnetic field applied to the object is not intense. Therefore, the cipher code or other kinds of information which are magnetically recorded in the code indicator section 18 or other portions of the object 10, are not destroyed by the external magnetic field.

Since the detection signal produced by the magnetic sensor 30 is based on the output ratio between two MR elements 31 and 32, it is not easily affected by the ambient temperature variations or noise. Although the output level of an ordinary magnetic head is dependent upon the moving speed of an object, the processing apparatus 20 of the embodiment, which comprises the magnetic sensor 30, can produce an output of constant level at all times, without being adversely affected by the moving speed of the object and the ambient temperature variations.

In the case where the cipher code is recorded in the code storage area of the host computer in the manufacturing process of the object 10, the cipher code may be read out from the host computer and collated with the detection signal in the collation process. Alternatively, in the collation process, the detection signal obtained in detection step S4 may be converted into a cipher code according to the same rules as those of the manufacturing process, and the cipher code, thus obtained, may be collated with the cipher code read in the code read step S12.

The magnetic elements 12 are formed of fibrous polymers, for example. As is shown in FIG. 11, each fibrous magnetic polymer element 12 is made up of an element main body 13 formed of a high molecular material, and magnetic metal powder 14 distributed inside the element main body 13. An example of a high molecular material used for forming the element main body 13 is polyethylene, polyester, or urethane, but any kind of synthetic resin can be used as the material of the element main body 13, as long as the synthetic resin has appropriate flexibility. As the material of the magnetic metal powder 14, either the powder of a magnetically-soft material having high magnetic permeability or the powder of a magnetically-hard material having high coercive force is suitable for use.

An example of a method used for manufacturing the magnetic polymer elements 12 is shown in FIG. 12. The manufacturing method shown in FIG. 12 is a dry process employing a double-structure container 15. The double-structure container 15 has an outer chamber 15a and an inner chamber 15b. The outer chamber 15a contains a molten high molecular material 13a which is heated at a temperature of, for example, 200° C. to 500° C. and which is therefore in the molten state, while the inner chamber 15b contains a mixture of a molten high molecular material and magnetic metal powder 14. The high molecular material 13a inside the outer chamber 15a and the magnetic metal powder 14 mixed with the high molecular material inside the inner chamber 15b, are allowed to fall or forcibly pushed out from a nozzle 16 located at the bottom of the container 15. While the high molecular material 13a coming out from the nozzle 16 cools and hardens, the magnetic metal powder 14 is incorporated inside the hardened high molecular material 13a.

Another example of a method used for manufacturing the magnetic polymer elements 12 is shown in FIG. 13. The manufacturing method shown in FIG. 13 is a wet process. In this wet process, a pipe 13b formed of a high molecular material and prepared beforehand is immersed in an alkaline solution 14a containing ions of a magnetic metal, thereby permitting the magnetic metal to be deposited on the inner face 13c of the pipe 13b.

The magnetic polymer elements 12 manufactured as above are incorporated in a scanning region 17 with a predetermined density during the manufacture of the object 10. Instead, a nonwoven fabric made of the magnetic polymer elements 12 and cut to have an appropriate size may be embedded in the scanning region 17 of the object 10.

The magnetic polymer elements 12 shown in the drawings are in the form of fibers. However, the cross section of them need not have a circular shape; it may have a polygonal shape, a rectangular shape, an oval shape, or any other shape desired. In addition, the elements 12 may be in the form of ribbons, foils or a mixture of these. The outer diameter D1 (or thickness) of the magnetic polymer elements 12 must be determined in accordance with the size of the object 10, but it is usually within the range of 5 to 50 μm. The particle diameter of the magnetic metal powder 14 is 1 μm or less. The appropriate mixing ratio of the magnetic metal powder 14 is 40 to 70% by volume. It is desirable that the magnetic metal powder 14 be located in the center of the cross sectional plane of the element 14.

A magnetic polymer element 12 used in the embodiment may be such an element as is depicted in FIG. 14. In the element depicted in FIG. 14, particles of magnetic metal powder 14 are distributed in the entire cross section of an element main body 13 formed of a high molecular material.

In the embodiment mentioned above, the magnetic polymer elements 12 used in the object 10 are very soft and flexible, and do not break even if they are bent. In the case where the magnetic polymer elements 12 are incorporated in a thin object 10, such as an object formed of paper, the elements 12 do not break or are not exposed from the surface of the object 10 even if the object 10 is bent. In addition, the pattern given to the object 10 during the manufacturing process is not altered even if the object 10 is bent.

The magnetic polymer elements 12 can be easily colored by known coloring means since the element main bodies 13, i.e., the outer portions of the elements 12, are formed of a high molecular material. Even if part of the elements 12 should be exposed from the surface of the object, such elements do not become an obstacle to printing or coloring and can therefore be concealed. In the case where the base member 11 of the object 10 is formed of paper, the elements 12 incorporated in the object 10 cannot be observed externally, thus providing a high degree of security. In the case where the magnetic metal powder 14 of the magnetic polymer elements 12 is formed of a material having high coercive force (e.g., a magnetically-hard material, such as ferrite, Sm-Co alloy, and Nd alloy), the magnetic polymer elements 12 can be magnetized beforehand.

According to the present invention, the magnetic polymer elements 12 can be embedded in the reverse side of the canvas of a painting, and the cipher code mentioned above can be recorded in a code indicator section. These procedures provide a proof that the painting is authentic. According to the present invention, moreover, the magnetic polymer elements 12 can be embedded in a three-dimensional art object, so as to distinguish it from its imitations.

What is claimed is:

1. A method for checking authenticity of an object wherein the object comprises a base member formed of a non-magnetic material and a scanning region in which magnetic elements formed of a high-permeability magnetic material are scattered at random, so that the magnetic elements they take a magnetized state when they are subjected to a magnetic field and take a non-magnetized state when application of the magnetic field is stopped, said method comprising a manufacturing process for manufacturing the object, and a collation process for checking the object, said manufacturing process including:

a scanning step for moving the scanning region of the object relative to a pair of magneto-electric transducers arranged side by side in a direction in which the scanning region is scanned, and for simultaneously applying an external magnetic field to the scanning region and to the magneto-electric transducers, a detection step for producing a detection signal peculiar to the scanning region of the object by detecting a variation in electric outputs which the magneto-electric transducers produce in accordance with a distribution of the magnetic elements when the magnetic elements move through a region in the vicinity of the magneto-electric transducers, a step for producing a cipher code by ciphering the produced detection signal, and a step for recording the produced cipher code in a code indicator section; and said collation process including:

a scanning step for moving the scanning region of the object relative to the magneto-electric transducers, and for simultaneously applying an external magnetic field to the scanning region and to the magneto-electric transducers, a detection step for detecting variations in electric outputs which the magneto-electric transducers produce in accordance with the distribution of the magnetic elements when the magnetic elements move through the region in the vicinity of the magneto-electric transducers, and for producing an output detection signal peculiar to the scanning region of the object, and a determination step for collating the output detection signal produced in the detection step with the cipher code recorded in the code indicator section, and for determining that the object is authentic when the cipher code recorded in the indicator section and the output detection signal agree with each other.

2. An apparatus for checking authenticity of an object wherein the object comprises a base member formed of a non-magnetic material, a scanning region in which magnetic elements formed of a high-permeability magnetic material are scattered at random, and a code indicator section, so that the magnetic elements they take a magnetized state when they are subjected to a magnetic field and take a non-magnetized state when applications of the magnetic field is stopped, said apparatus comprising:

a magnetic sensor including first and second magneto-electric transducers arranged side by side in a direction in which the scanning region of the object is scanned;

a magnetic field generator for applying an external magnetic field to the magneto-electric transducers and to the scanning region;

a conveyor for conveying the object in the scanning direction relative to the magneto-electric transducers;

a detection circuit for detecting variations in electric outputs which the magneto-electric transducers produce in accordance with a distribution of the magnetic elements when the magnetic elements move through a region in the vicinity of the magneto-electric transducers, and for producing a detection signal peculiar to the scanning region of the object;

a coding unit for producing a cipher code by enciphering the detection signal produced by the detection circuit;

a code writing unit for recording the produced cipher code in the code indicator section;

a reading unit for reading the cipher code recorded in the code indicator section; and a collating unit for collating the cipher code read by the reading unit with the detection signal produced by the detection circuit, and for determining that the object is authentic when the read cipher code and the produced detection signal agree with each other.

3. An apparatus for checking authenticity of an object wherein the object comprises a base member formed of a non-magnetic material, a scanning region in which magnetic elements formed of a magnetic material are scattered at random, and a code indicator section, said apparatus comprising:

a magnetic sensor including first and second magneto-electric transducers arranged side by side in a direction in which the scanning region of the object is scanned;

a magnetic field generator for applying an external magnetic field to the magneto-electric transducers and to the scanning region;

a conveyor for conveying the object in the scanning direction relative to the magneto-electric transducers;

a detection circuit for detecting variations in electric outputs which the magneto-electric transducers produce in accordance with a distribution of the magnetic elements when the magnetic elements move through a region in the vicinity of the magneto-electric transducers, and for producing a detection signal peculiar to the scanning region of the object;

a coding unit for producing a cipher code by enciphering the detection signal produced by the detection circuit;

a code writing unit for recording the produced cipher code in the code indicator section;

a reading unit for reading the cipher code recorded in the code indicator section; and a collating unit for collating the cipher code read by the reading unit with the detection signal produced by the detection circuit, and for determining that the object is authentic when the read cipher code and the produced detection signal agree with each other, and wherein:

said magneto-electric transducers comprise magnetoresistor elements;

said magnetoresistor elements are spaced from each other by an element spacing which is 1 to 30 times greater than a diameter or width of one magnetic element; and each of said magnetoresistor elements has an element width which is less than $\frac{1}{3}$ of the element spacing, and an element length which is 3 to 20 times greater than the element spacing.

4. The apparatus according to claim 3, wherein said element spacing is 10 to 20 times greater than the diameter or width of the magnetic element, and said element length is 5 to 10 times greater than the element spacing.

5. The apparatus according to claim 3, wherein:

the external magnetic field which the magnetic field generator applies to the magnetic sensor has an intensity higher than that of a saturation magnetic field of the magnetic elements; and a range of application of said external magnetic field applied by the magnetic field generator is greater than a sum of the element spacing and the element width in a width-wise direction of the magnetoresistor elements, and is greater than the element length in a lengthwise direction of the magnetoresistor elements.

6. The apparatus according to claim 3, wherein said magnetic elements are formed of a high-permeability material so that they take a magnetized state when they are subjected to a magnetic field, and take a non-magnetic state when application of the magnetic field is stopped.

* * * * *

UNITED STATES PATENT AND TRADEMARK OFFICE
CERTIFICATE OF CORRECTION

PATENT NO. : 5,451,759
DATED : September 19, 1995
INVENTOR(S) : HOSHINO et al

It is certified that error appears in the above-indentified patent and that said Letters Patent is hereby corrected as shown below:

In the Title Page, under Section [56] REFERENCES CITED,

After 5,289,122,

Change "2/1991" to --2/1994--.

Signed and Sealed this

Twenty-third Day of April, 1996

Attest:

BRUCE LEHMAN

*Attesting Officer*  Commissioner of Patents and Trademarks